United States Patent [19]

Grosbard

[11] 3,793,600

[45] Feb. 19, 1974

[54] RECORD MEDIUM WITH VALIDATING AND CANCELLING FEATURE AND METHOD

[75] Inventor: Gregory Grosbard, New York, N.Y.

[73] Assignee: Strategic Automated Systems, Inc., Salt Lake City, Utah

[22] Filed: Mar. 16, 1971

[21] Appl. No.: 124,869

[52] U.S. Cl. 235/61.12 N, 235/61.11 E, 340/146.3 B

[51] Int. Cl. .............................................. G06k 7/12

[58] Field of Search.... 235/61.12, 61.11 E, 61.11 A

[56] References Cited

UNITED STATES PATENTS

| | | | |
|---|---|---|---|
| 2,254,931 | 9/1941 | Bryce | 235/61.12 M |
| 2,914,746 | 11/1959 | James | 235/61.12 R |
| 2,990,308 | 6/1961 | Goldstein | 250/71 R |
| 3,471,684 | 10/1969 | Berezov | 235/61.12 R |
| 2,704,634 | 3/1955 | Rauch | 250/219 DC |
| 3,279,826 | 10/1966 | Rudershausen | 235/61.12 R |
| 3,245,051 | 4/1966 | Robb | 340/173 SP |
| 3,412,220 | 11/1968 | Puppolo | 340/173 SP |

*Primary Examiner*—Maynard R. Wilbur
*Assistant Examiner*—Robert F. Gnuse
*Attorney, Agent, or Firm*—Clarence A. O'Brien; Harvey B. Jacobson

[57] ABSTRACT

A data processing card on which information is recorded magnetically, by punch hole coding, printing, color coding and by other means. By passing current through fusible strips embedded in the card adjacent one edge thereof, visible characters are formed to signify the card has been cancelled. Cancelling is effected after all desired data processing operations have been performed on a validated card.

10 Claims, 6 Drawing Figures

PATENTED FEB 19 1974
3,793,600
Fig. 1
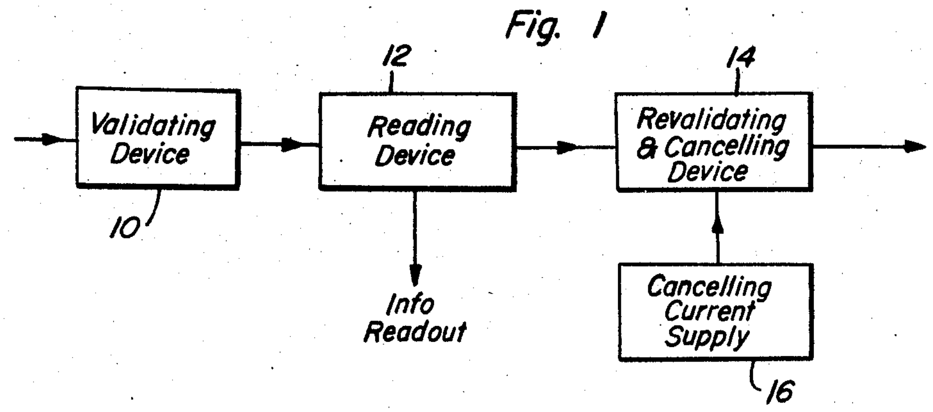
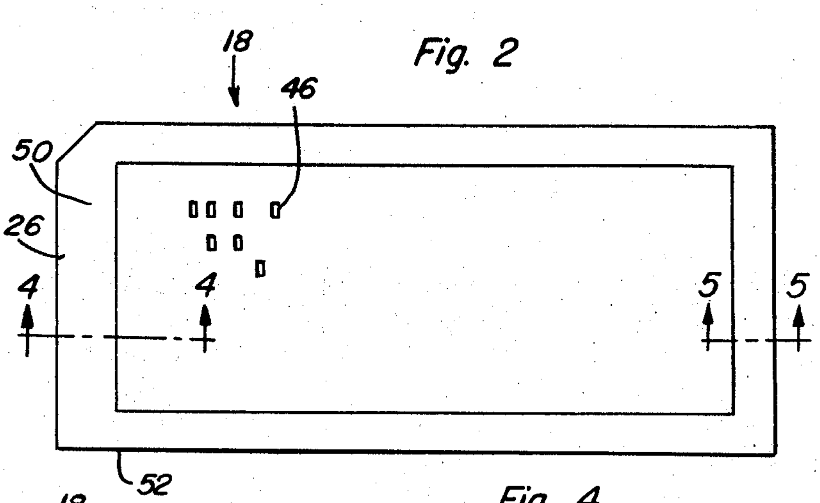
Fig. 2
Fig. 3
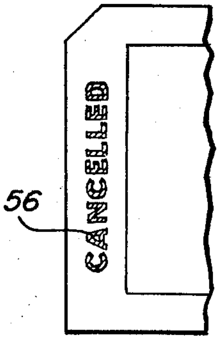
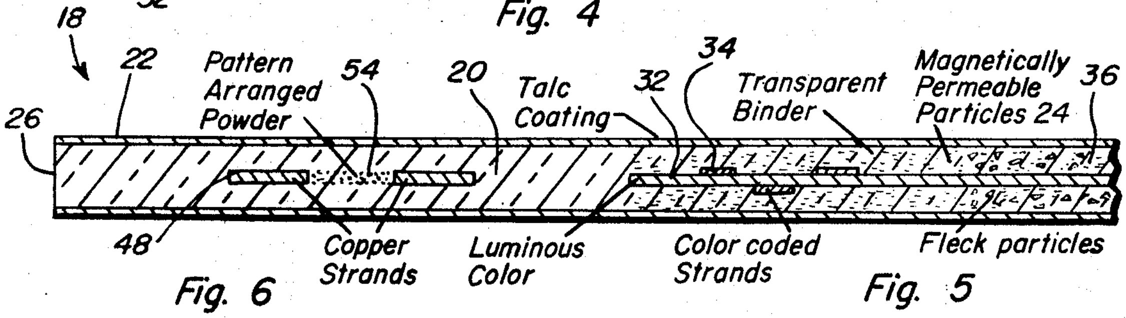
Fig. 4
Fig. 6
Fig. 5
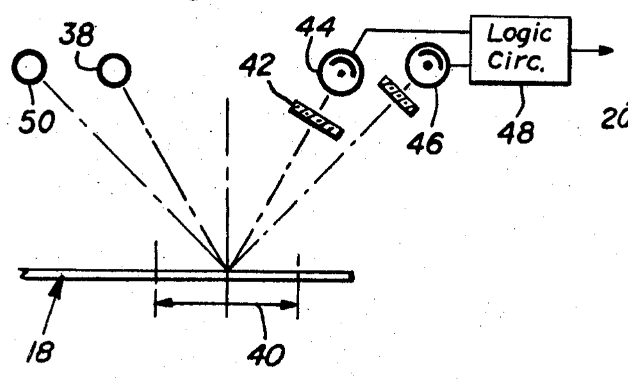
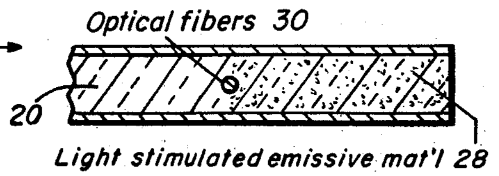
Gregory Grosbard
INVENTOR.
BY Clarence A. O'Brien and Harvey B. Jacobson
Attorneys

RECORD MEDIUM WITH VALIDATING AND CANCELLING FEATURE AND METHOD

This invention pertains to data processing cards and more particularly to a particular data processing card structure and method associated therewith and is related to the invention as disclosed in my prior copending application U. S. Ser. No. 759,840, filed Sept. 16, 1968.

There is a present need for data processing cards to not only form a record for information that may be processed, stored and retrieved, but to also serve as an identifying document such as a stock certificate. In such a capacity, the data processing card must also possess attributes making it suitable for validating and cancelling operations. Further, the data processing card must be designed to record and readout information by different means and methods. Also, the design and structure of the card must comply with various requirements that may be set, for example, by a regulatory agency in connection with the use of the card as an official document or certificate.

It is therefore an important object of the present invention to provide a data processing card which will meet the various requirements and have the different capabilities and properties necessary to serve the aforementioned purposes. An additional object is to provide a method utilizing the specially designed data processing card to prevent unauthorized data processing by use of record media other than genuine data bearing documents or certificates.

In accordance with the present invention, a data processing card which also serves as an official document such as a stock certificate, is internally structured and coded so that it may be validated as well as to be processed for data storage and readout purposes. Thus, the data processing card is made of a body of material embedding magnetically permeable particles, radiation reflective fleck particles, light stimulated emissive particles, color coded strands, luminous color background layer, optical fibers, and fusible strips within a light transmissive binder. The fusible strips are located adjacent one edge of the card not subjected to printing and engraving pressures so that by passing electrical current through that portion of the card, a cancelling mark is established after all desired data processing operations are performed on the card.

These together with other objects and advantages which will become subsequently apparent reside in the details of construction and operation as more fully hereinafter described and claimed, reference being had to the accompanying drawings, forming a part hereof, wherein like numerals refer to like parts throughout, and in which:

FIG. 1 is a schematic block diagram showing the basic operations for which the data processing card of the present invention is useful.

FIG. 2 is a top plan view of a typical data processing card constructed in accordance with the present invention.

FIG. 3 is a partial top plan view of a cancelled card.

FIG. 4 is an enlarged partial sectional view of the card taken substantially through a plane indicated by section line 4—4 in FIG. 2.

FIG. 5 is an enlarged partial sectional view taken substantially through a plane indicated by section line 5—5 in FIG. 2.

FIG. 6 is a simplified diagrammatic view showing use of a portion of the data processing card for validating or information readout purposes.

Referring now to the drawings in detail, FIG. 1 illustrates in simplified form some of the operational stations through which data processing cards constructed in accordance with the present invention may pass, in connection with or as a part of a computer program. As one example, the computer program may be designed for stock transaction purposes as disclosed for example in my prior copending application U.S. Ser. No. 796,502, filed Feb. 4, 1969. In such case, the data processing card will also serve as a stock certificate meeting all of the requirements that may be set by a regulatory agency such as the Securities Exchange Commission. At one stage in the programming system, the data processing card passes through a validating station 10 as shown in FIG. 1 thereby restricting further data processing to validated cards. The desired information may be extracted by a reading device 12 before the card is passed through a revalidating and cancelling device 14 to which a supply of electrical current is fed from 16 in order to effect cancellation as will be explained hereafter. Apparatus for validating and reading information recorded on the cards by the different methods aforementioned, are disclosed, for example, in my prior copending applications, Ser. Nos. 770,052, 820,997 and 822,850, respectively, filed Oct. 23, 1968, May 1, 1969 and Apr. 17, 1969. It will therefore be apparent from FIG. 1, that any data processing system may be designed in accordance with the present invention to prevent unauthorized data processing if non-cancelled data processing cards other than those which have been validated are utilized.

A typical data processing card generally referred to by reference numeral 18, is shown in FIGS. 2, 4 and 5. It will be observed from the embodiment illustrated in FIG. 2, that the card is generally rectangular in shape and formed of a relatively thin, planar body of material. It is presently contemplated that the shape and the dimensions of the card will be identical to conventional data processing cards in widespread use. Therefore, processing of the card 18 may be performed with the basic data processing hardware presently available which must of course be modified in accordance with the present invention in order to serve the validating and cancelling operations.

In one form of the invention as shown in the drawings, the body of the card is made of a suitable light transmissive or transparent binder 20, forming part of a laminate structure. Alternatively, the body of the card may be made of 100 percent cotton rag, 100 percent wood pulp or mixtures of both. However, for a laminate structure, a Nylon-like material may be utilized as the binder such as "Versalon," an adhesive manufactured by General Mills. The opposite faces or surfaces of the card are coated with a talc-like material 22 as shown in FIG. 4 in order to make said surfaces uniformly reflective.

Various solids may be embedded within the binder in order to accommodate validation, cancellation, information coding and recording. For example, information may be magnetically recorded by dispersing magnetically permeable particles 24 throughout the binder 20 spaced from at least one edge 26 of the card for reasons to be hereafter explained. The magnetically permeable particles may be magnetically orientated in perpendicular directions for narrow and wide specturm recording by travel of the card in perpendicular directions.

Certain zones of the card may also embed a light stimulated, emissive material such as zinc sulfate power 28 as shown in FIG. 5 as well as optical fibers 30. Optical sensing of data in the card is thereby made possible for either validating or information reading purposes.

The card may also be structured internally for color coding purposes by including an internal background lay 32 made of a luminous coding pigment as shown in FIG. 4. This background enables color coded strands 34 to be detected more positively by optical detectors.

The card may also embed within discrete zones thereof, a concentration of product identification phosphor particles 36 as shown in FIG. 4. These particles are visible when exposed to uniform source of radiant energy of proper wave length. Thus, as diagrammatically shown in FIG. 6, a source of ultra-violet radiation 38 when directing radiation onto a discrete zone 40 of the card will produce an emission that passes through an ultra-violet filter 42 to a photocell 44 in order to measure the density of the flecks disposed within the zone 40 for validating or information reading purposes. Further the card may be encoded by a mixture of quenchable and unquenchable phosphors with a second photocell 46 connected to the same logic circuit 48 as the photocell 44. While both the quenchable and unquenchable phosphors are excited by the ultra-violet light source 38, the quenchable phosphors are subsequently quenched by the introduction of infra-red radiation from source 50 as diagrammatically shown in FIG. 6. Phosphors of the type referred to are commercially available and marketed, for example, by United States Radium Corporation of Morristown, N.J. as a "PI (product identification) Phosphor."

The arrangement described with respect to FIG. 6, provides a quantitive and qualitive detective of phosphors in a premeasured, encoded mixture to accept or reject the record medium through the logic circuit 48. The sources 38 and 50 are sequentially energized to excite the phosphor mixture and then quench the excited quenchable phosphors therein. The photocell 44 detects emission from the unquenchable phosphors in the mixture to produce a read out emission curve corresponding thereto. The other photocell 46 detects emission from the quenchable phosphors to produce a second read out emission curve affected by the quenching action of the infra-red light source 50.

Other zones of the data processing card may be coded by other methods such as punch hole coding. Fig. 2 thus shows punch holes 47 formed in the card. The peripheral edges of the cards may also be color coded. The card may also fulfill other requirements by leaving certain areas white and providing magnetically readable characters to serialize each card independent of the other data recorded thereon. Optical character reading surfaces may also be formed on the card for stock certificate requirements. Of course, in view of its capacity as a stock certificate, printing with visible ink both internally and externally of the card is contemplated.

In order to provide for cancellation of the card, means toward this end are embedded in the body of the card adjacent the edge 26. This edge is selected since no printing and engraving pressures are to be exerted thereat as well as to avoid interference with physical brush contact as the card passes through a validating device such as disclosed for example in my aforementioned application Ser. No. 770,052, filed Oct. 23, 1968. As shown in FIG. 4, a pair of spaced copper strands or foil strips 48 are embedded within the body of the card closely spaced from the edge 26 within the border zone 50 shown in FIG. 2. These foil strips are exposed at the edge 52 of the card perpendicular to the edge 26 so that electrical current may be passed to the foil strips as the card is moved through the cancelling device. Cancelling current from the supply 16 will accordingly be fed to the foil strips through suitable brush contacts engaging the edge 52 when the desired information has been extracted from the card. Passage of current through the foil strips 48 causes fusing thereof and generates heat conducted to a magnetically permeable metal powder 54 disposed between the copper strands 48. One example of such a powder is "Ceramagnet B G," manufactured by Stackpole Carbon Company of Kane, Pennsylvania. The powder 54 may be arranged in a pattern so as to form visible characters 56 as shown in FIG. 3 when the heat of fusion of the copper strands is transmitted thereto during the cancelling operation. Alternatively, a visible cancelling mark may be formed or the edge portion deformed so as to preclude further machine processing. Because of the magnetic property of the powder 54, cancellation may also be magnetically detected. It should of course be appreciated that this cancelling operation occurs only in connection with cards capable of being validated because of the coded structure thereof after the desired information has been extracted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A data processing record medium comprising a relatively thin body having peripheral edges and substantially parallel external surfaces, said body being made of a binder material within which solid particles are embedded spaced from at least one of said edges, electrically fusible means embedded within the body closely adjacent said one of the edges and exposed through another of the edges, and character forming means embedded within the body in conductive relation to the fusible means for forming a visible pattern in response to fusing of the fusible means.

2. The record medium defined in claim 1 wherein said particles are magnetically permeable and magnetically orientated in perpendicular directions.

3. The record medium defined in claim 2 including a luminous background layer embedded within the body spaced from said one of the edges, said binder material being light transmissive, and color strands positioned on said background layer in an internally coded pattern.

4. The record medium defined in claim 3 wherein said particles also include a fleck material within at least one discrete zone having a radiation reflective property with respect to non-visible radiation.

5. The record medium defined in claim 4 wherein said character forming means is in the form of metallic powder.

6. The record medium defined in claim 5 wherein light stimulated emissive material and optical fibers are embedded in the body.

7. The record medium defined in claim 1 wherein said character forming means is in the form of metallic powder.

8. An information bearing document comprising a relatively thin card-like body and radiation stimulated means embedded therein, including a coded mixture of phosphors quenchable and unquenchable by infra-red radiation.

9. The document defined in claim 8 including electrically fusible means embedded within the body, and character forming means embedded within the body in conductive relation to the fusible means for forming a visible pattern in response to fusing of the fusible means.

10. The combination of claim 8 wherein said quenchable and unquenchable phosphors are excitable by ultra-violet radiation.

* * * * *